United States Patent
Zeng (10) Patent No.: US 10,149,162 B2
(45) Date of Patent: Dec. 4, 2018

(54) ENCRYPTION METHOD BASED ON MOBILE TERMINAL FOR BLUETOOTH WATCH AND THE BLUETOOTH WATCH THEREOF

(71) Applicant: HUIZHOU TCL MOBILE COMMUNICATION CO., LTD, Huizhou, Guangdong (CN)

(72) Inventor: Peng Zeng, Huizhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 0 days.

(21) Appl. No.: 15/541,694

(22) PCT Filed: Aug. 12, 2016

(86) PCT No.: PCT/CN2016/094897
§ 371 (c)(1),
(2) Date: Jul. 5, 2017

(87) PCT Pub. No.: WO2017/088529
PCT Pub. Date: Jun. 1, 2017

(65) Prior Publication Data
US 2018/0213399 A1    Jul. 26, 2018

(30) Foreign Application Priority Data

Nov. 26, 2015 (CN) .......................... 2015 1 0848056

(51) Int. Cl.
*H04M 3/16* (2006.01)
*H04W 12/06* (2009.01)
(Continued)

(52) U.S. Cl.
CPC ........... *H04W 12/06* (2013.01); *H04L 9/3226* (2013.01); *H04M 1/7253* (2013.01);
(Continued)

(58) Field of Classification Search
CPC ..................................................... H04W 12/06
(Continued)

(56) References Cited

U.S. PATENT DOCUMENTS

2016/0307012 A1* 10/2016 Narasimha .............. G06F 21/35
2017/0061405 A1*  3/2017 Bryant ............... G06Q 20/4014

FOREIGN PATENT DOCUMENTS

| CN | 104200143 A | 12/2014 |
| CN | 10465643 A  | 5/2015  |
| CN | 104993934 A | 10/2015 |

* cited by examiner

*Primary Examiner* — Joel Ajayi (57) ABSTRACT

An encryption method based on a mobile terminal for a Bluetooth watch and the Bluetooth watch thereof are disclosed. The method includes: the Bluetooth watch establishing a communication connection with a mobile terminal; displaying, by a screen of the Bluetooth watch, an encrypted interface to prompt a user to enter an initial password; receiving the initial password from the user and storing the initial password in the Bluetooth watch; detecting whether the Bluetooth watch is removed by the user; hiding the instant notification message received from the mobile terminal, and displaying an unlock interface on the screen to prompt the user to enter an unlock password, when the Bluetooth watch is determined to be removed by the user; receiving the unlock password entered by the user at the unlock interface; and unlocking and displaying the instant notification message received from the mobile terminal, when the unlock password matches the encryption password.

17 Claims, 3 Drawing Sheets

(51) Int. Cl.
*H04W 4/80* (2018.01)
*H04M 1/725* (2006.01)
*H04L 9/32* (2006.01)

(52) U.S. Cl.
CPC ......... *H04M 1/72577* (2013.01); *H04W 4/80* (2018.02); *H04L 2209/80* (2013.01)

(58) Field of Classification Search
USPC ........................................................ 455/411
See application file for complete search history.

ENCRYPTION METHOD BASED ON MOBILE TERMINAL FOR BLUETOOTH WATCH AND THE BLUETOOTH WATCH THEREOF

TECHNICAL FIELD

This disclosure relates generally to the field of Bluetooth watch, and more particularly, to an encryption method based on a mobile terminal for a Bluetooth watch and the Bluetooth watch thereof.

BACKGROUND

With rapid developments of Bluetooth watch technology, more and more features have been integrated into a Bluetooth watch. Among them, a feature to display an instant message on the Bluetooth watch, especially an instant notification message from a mobile phone, has been increasingly widely implemented. In the meantime, the importance of security in the instant message displayed on the Bluetooth watch is increasingly growing.

Currently, an instant notification message from a mobile phone is received by a Bluetooth watch, regardless of whether the Bluetooth watch is worn by a user or not. If the instant notification message received by the Bluetooth watch is associated with the privacy of the user, the instant notification message may be leaked when the user was not wearing the Bluetooth watch, for example, when the user went in a shower or left the Bluetooth watch in a room; and thus the instant notification message may be viewed by a family member (e.g., a lover) and/or anon-family member (e.g., a business partner or a competitor).

In light of this, it yet remains a problem to be solved in how to ensure the Bluetooth watch to display the instant notification message from the mobile phone in a secured way.

SUMMARY

A principal technical problem to be addressed by the disclosure is to provide an encryption method based on a mobile terminal for a Bluetooth watch and the Bluetooth watch thereof, to reduce a probability of leaking the instant notification message when the Bluetooth is not worn; hence to improve the information security when the Bluetooth watch is in use.

According to an aspect of the disclosure, a Bluetooth watch is disclosed that includes a processor, a memory coupled to the processor, a receiver coupled to the processor, and a display screen coupled to the processor. The memory may be configured to store program instructions. The receiver may be configured to receive an instant notification message. The display screen may be configured to display an encrypted interface and an unlock interface. The processor may be configured to execute program instructions to establish a communication connection between the Bluetooth watch and a mobile terminal, so that the receiver of the Bluetooth watch receives the instant notification message from the mobile terminal. The processor may be further configured to display the encrypted interface on the display screen of the Bluetooth watch to prompt a user to enter an initial password, after the communication connection is successfully established. The processor may be further configured to receive the initial password entered by the user at the encrypted interface and store the initial password in the Bluetooth watch. The processor may be further configured to detect whether the Bluetooth watch is removed by the user. The processor may be further configured to hide the instant notification message received from the mobile terminal and display an unlock interface on the display screen to prompt the user to enter an unlock password, when the Bluetooth watch is detected to be removed by the user. The processor may be further configured to receive the unlock password entered by the user at the encrypted interface. The processor may be further configured to unlock the Bluetooth watch and display the instant notification message received from the mobile terminal, when the unlock password matches the encryption password.

In some embodiments, after the processor is further configured to receive the initial password entered by the user at the encrypted interface and store the initial password in the Bluetooth watch, the processor may be further configured to seta predefined number of times for entering the unlock password.

In some embodiments, the processor may be further configured to detect whether the number of unlock passwords entered by the user at the unlock interface exceeds the predefined number of times, when the unlock password does not match the encryption password; and wherein the Bluetooth watch restores factory settings and waits to re-establish a communication connection with the mobile terminal, when the number of unlock passwords entered by the user at the unlock interface exceeds the predefined number of times.

In some embodiments, the block of the processor further configured to detect whether the Bluetooth watch is removed by the user may include:

the processor is configured to detect whether there is a heartbeat within a predetermined time period; and the processor is configured to detect the Bluetooth watch is removed by the user, if the processor is configured to detect no heartbeat within the predetermined time period. The communication method used for Bluetooth watch and mobile terminal is a Bluetooth communication connection.

In some embodiments, the encrypted interface may be an interface with a nine-grid pattern.

According to another aspect of the disclosure, an encryption method based on a mobile terminal for a Bluetooth watch is disclosed that includes:

establishing, by the Bluetooth watch, a communication connection with a mobile terminal, so that the Bluetooth watch receives an instant notification message from the mobile terminal;

displaying, by a screen of the Bluetooth watch, an encrypted interface to prompt a user to enter an initial password, after the communication connection is successfully established;

receiving, by the Bluetooth watch, the initial password from the user and storing the initial password in the Bluetooth watch;

receiving, by the Bluetooth watch, the unlock password entered by the user at the unlock interface; and unlocking, by the Bluetooth watch, and displaying the instant notification message received from the mobile terminal, when the unlock password matches the encryption password.

In some embodiments, the method may further include, after the block of the Bluetooth watch receiving the initial password entered by the user at the encrypted interface and storing the initial password in the Bluetooth watch, setting, by the Bluetooth watch, a predefined number of times for entering the unlock password.

In some embodiments, the method may further include, detecting, by the Bluetooth watch, whether the number of unlock passwords entered by the user exceeds the predefined number of times when the unlock password does not match the encryption password; and restoring, by the Bluetooth watch, factory settings and re-establishing, by the Bluetooth watch, the communication connection with the mobile terminal, when the number of unlock passwords entered by the user exceeds the predefined number of times.

In some embodiments, the block of the Bluetooth watch detecting whether the Bluetooth watch is removed by the user may include:

detecting, by the Bluetooth watch, whether there is a heartbeat within a predetermined time period; and determining, by the Bluetooth watch, the Bluetooth watch is removed by the user, if the Bluetooth watch cannot detect a heartbeat within the predetermined time period.

In some embodiments, the communication method is a Bluetooth communication connection.

In some embodiments, the encrypted interface is an interface with a nine-grid pattern.

According to another aspect of the disclosure, a Bluetooth watch is provided that includes a communication establishment module configured to establish a communication connection between the Bluetooth watch and a mobile terminal to enable the Bluetooth watch to receive an instant notification message from the mobile terminal; a first display module configured to display an encrypted interface to prompt a user to enter an initial password on a screen of the Bluetooth watch when the Bluetooth watch successfully establish the communication connection with the mobile terminal; a first receiver module configured to receive the initial password entered by the user at the encrypted interface and store the initial password in the Bluetooth watch; a first detection module configured to detect whether the Bluetooth watch is removed by the user; a second display module for configured to hiding the instant notification messages received from the mobile terminal after detecting that the Bluetooth watch is removed by the user and display an unlock interface to prompt the user to enter an unlock password on the screen of the Bluetooth watch; a second receiver module configured to receive an unlock password entered by the user at the unlock interface; an unlock module configured to unlocking the Bluetooth watch and displaying the instant notification message received from the mobile terminal on the screen of the Bluetooth watch, when the unlock password matches the encryption password.

In some embodiments, the Bluetooth watch may further include a predefined number setting module configured to set a predefined number of times for entering the unlock password, after the first receiver module receiving the initial password entered by the user at the encrypted interface and storing the initial password in the Bluetooth watch.

In some embodiments, a second detection module may be configured to detect whether the number of unlock passwords entered by the user exceeds the predefined number of times, when the unlock password does not match the encryption password, wherein the Bluetooth watch restores factory settings and waits to re-establish a communication connection with the mobile terminal, when the number of the unlock passwords entered by the user at the unlock interface exceeds the predefined number of times.

In some embodiments, the communication method may be a Bluetooth communication connection. The encrypted interface may be an interface with a nine-grid pattern.

Advantages of the disclosure may follow. As compared with the prior art, this disclosure of an encryption method based on a mobile terminal for a Bluetooth watch and the Bluetooth watch thereof may establish a communication connection between the mobile terminal and the Bluetooth watch, so that the Bluetooth watch can receive an instant notification message from a mobile terminal. When the communication connection between mobile and the watch is successfully established, an encrypted interface may be displayed on the screen of the Bluetooth watch, prompting user to enter an initial password. The initial password entered by the user at the encrypted interface may be stored in the Bluetooth watch. The Bluetooth watch may detect whether or not the Bluetooth watch is removed by the user. When the Bluetooth watch is detected to be removed by the user, the Bluetooth watch may display an unlock interface on the screen to prompt the user to enter an unlock password and may receive the unlock password. The Bluetooth watch may unlock and display the instant notification message received from the mobile terminal when the unlock password matches an encryption password. By the one or more implementations as described above, the subject technology may reduce the possibility of leaking the user's private information when the Bluetooth watch is removed by the user, and thus improve information security when using a Bluetooth watch.

DETAILED DESCRIPTION

The detailed description set forth below is intended as a description of the subject technology with reference to the appended figures and embodiments.

Figure 1:
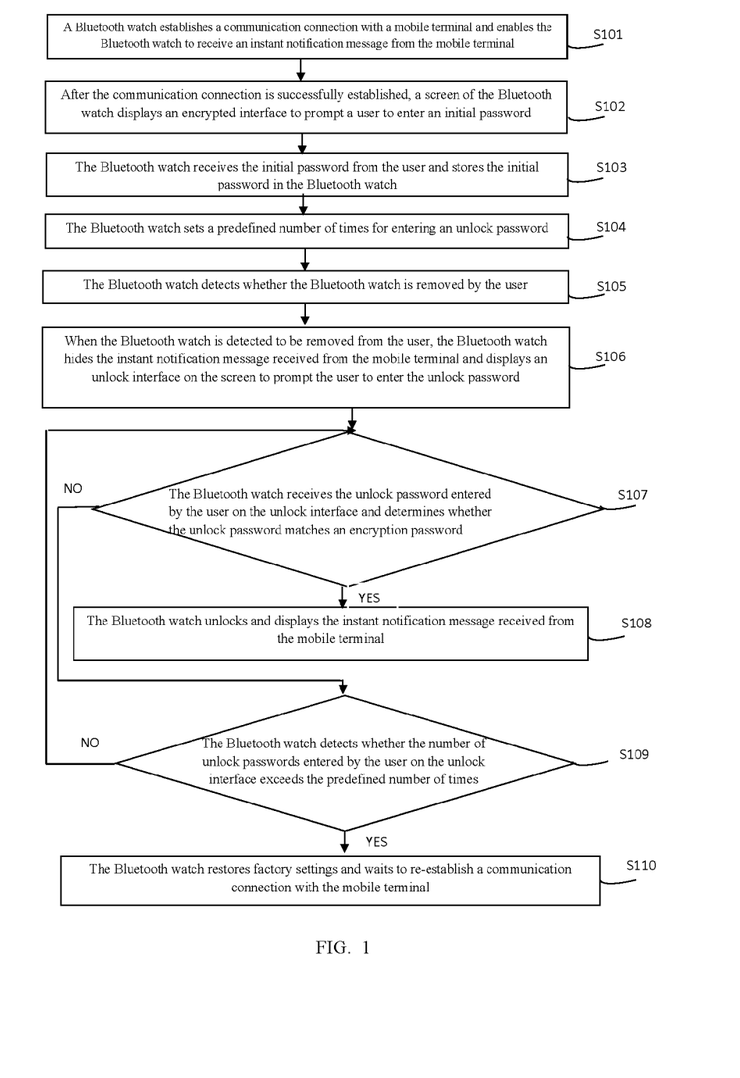
FIG. 1 is a flow diagram illustrating an encryption method based on a mobile terminal for a Bluetooth watch according to an embodiment of the disclosure.

Turning to FIG. 1, a flow diagram of an encryption method based on a mobile terminal for a Bluetooth watch according to an embodiment of the disclosure is depicted. It may be noted that, one or more implementations of the present disclosure may not be limited to blocks in the flow diagram as shown in FIG. 1, if substantially the same results can be produced by one or more other arrangements.

As shown in FIG. 1, the method as illustrated may include the following blocks.

At block S101, a communication connection may be established between Bluetooth watch and a mobile terminal to enable the Bluetooth watch to receive an instant notification message from the mobile terminal.

At block S101, the communication connection may include a Bluetooth communication connection. The process of establishing the Bluetooth communication connection with the mobile terminal may include a pairing process and a process of establishing a Bluetooth connection.

In some embodiments, the pairing process between the Bluetooth watch and the mobile terminal may practically include an authentication process; that is, a first communication authentication may be performed between the Bluetooth watch and the mobile terminal in the form of the pairing process. After completing the pairing process, the Bluetooth watch and the mobile terminal may establish an initial authentication code by a PIN code for any subsequent Bluetooth connection. In some embodiments, a subsequent Bluetooth connection may not perform a pairing process every time after completing the pairing process. The Bluetooth watch and the mobile terminal may need to obtain a predetermined PIN code before the pairing process. In addition, each of different mobile terminals may perform a pairing process with the same Bluetooth watch.

In the present embodiment, the process to establish the communication connection between the Bluetooth watch and the mobile terminal may specifically include the following steps. The Bluetooth watch may page the mobile terminal by frequency modulation; the mobile terminal may scan the external paging signals at a fixed time interval and then the mobile terminal may establish an ACL (Asynchronous Connectionless Link) connection with the Bluetooth watch. After the ACL connection is established, the Bluetooth watch may initiate a L2CAP (Logical Link Control and Adaptation Protocol) connection request. After establishing the L2CAP connection, the Bluetooth watch may implement SDP (Service Discovery Protocol) to query a Bluetooth service of the mobile terminal, and thus may obtain an rfcomm channel number. Then, the Bluetooth watch may initiate an rfcomm connection request to establish an rfcomm connection. At this time, the Bluetooth connection between the Bluetooth watch and the mobile terminal is completed, and the Bluetooth watch may receive an instant notification message from the mobile terminal.

In one or more other embodiments, the communication connection between the Bluetooth watch and the mobile terminal may include one or more communication connections which are different from the Bluetooth connection, including for example, a WIFI connection, as long as the Bluetooth watch can receive the instant notification message from the mobile terminal.

At block S102, an encrypted interface may be displayed on a screen of the Bluetooth watch to prompt a user to enter an initial password after the communication connection is successfully established.

At block S102, after the communication connection is successfully established as described with reference to block S101, an encrypted interface may pop up on the screen of the Bluetooth watch to prompt the user to enter an initial password. Preferably, the encrypted interface may be a graphical encrypted interface, in particular, an encrypted interface with a nine-grid pattern.

At block S103, the initial password from the user is received by the Bluetooth watch and stored in the Bluetooth watch.

At block S103, the process of the Bluetooth watch receiving the initial password from the user and storing the initial password in the Bluetooth watch may specially include the following steps. The Bluetooth watch may receive a plurality of initial passwords entered by the user at the encrypted interface for a plurality of times. The Bluetooth watch may compare each of the plurality of initial passwords and if each of the plurality of initial passwords is identical, one of the initial passwords may be stored in the Bluetooth watch; otherwise, the Bluetooth watch may prompt the user to reenter an initial password. Preferably, the plurality of initial passwords entered for a plurality of times may be the plurality of initial passwords entered for two times.

At block S104, a predefined number of times for entering an unlock password may be set by the Bluetooth watch.

At block S104, the screen of the Bluetooth watch may further display an interface to prompt the user to enter a predefined number of times for the unlock password after setting the initial password successfully as described with reference to block S103, and then the Bluetooth watch may store the predefined number of times entered by the user for the unlock password in the Bluetooth watch.

At block S105, Bluetooth watch is detected whether it is removed by the user.

At block S105, the process of the Bluetooth watch detecting whether the Bluetooth watch is removed by the user may specially include the following steps. The Bluetooth watch may detect whether or not there is a heartbeat within a predetermined time period. If the Bluetooth watch cannot detect a heartbeat within the predetermined time period, it may indicate that the Bluetooth watch may be removed by the user. If the Bluetooth watch can detect a heartbeat within the predetermined time period, then it may indicate that the Bluetooth watch may be worn by the user. The predetermined time period is preferably two minutes.

At block S106, the instant notification message received from the mobile terminal may be hidden and an unlock interface may be displayed on the screen to prompt the user to enter the unlock password, when the Bluetooth watch is detected to be removed by the user.

At block S106, when it is detected that the Bluetooth watch is removed by the user as described with reference to block S105, the Bluetooth watch may hide the instant notification message received from the mobile terminal, so that the instant notification message may not be viewed by one or more outsiders, and the possibility of leaking the user's private information may be greatly reduced.

When the user needs to use the Bluetooth watch again, for example, the user needs to check instant notification messages or enter an application interface of the Bluetooth watch, the user may click on the screen of Bluetooth watch to display an unlock interface where the user can enter the unlock password. Preferably, the unlock interface and the encrypted interface may be the same nine-grid encrypted interface.

At block S107, the unlock password entered by the user at the unlock interface is received and it is determined that whether the unlock password matches an encryption password. If it is determined that the unlock password matches the encryption password, block S108 is performed. If it is determined that the unlock password does not match the encryption password, block S109 is performed.

At block S108, the Bluetooth watch is unlocked and the instant notification message received from the mobile terminal is displayed.

At block S108, when it is determined at block S107 that the unlock password entered by the user matches the encryption password, the Bluetooth watch may be unlocked automatically and the instant notification message received from the mobile terminal may be displayed.

At block S109, it is detected that whether the number of unlock passwords entered by the user at the unlock interface exceeds the predefined number of times. If the number of unlock passwords does not exceed the predefine number of times, then block S107 is performed. If the number of unlock passwords exceeds the predefined number of times, then block S110 is performed.

At block S109, when the number of unlock passwords exceeds the predefined number of times which is set at block S104, it may indicate that a current user who enters the unlock password may not be an owner of the Bluetooth watch, then block S110 may be performed to prevent the current user from viewing the instant notification message received from the mobile terminal.

At block S110, the Bluetooth watch is restored to factory settings and waits to re-establish a communication connection with the mobile terminal.

At block S110, when it is determined at block S107 and block S109 that each of the unlock passwords entered by the user at the predefined number of time does not match an encryption password, the Bluetooth watch may be set to restore to factory settings. Then, the Bluetooth watch may need to re-establish a communication connection with the mobile terminal to receive instant notification messages from the mobile terminal if the user needs to continue to use the Bluetooth watch to view instant notification messages.

Figure 2:
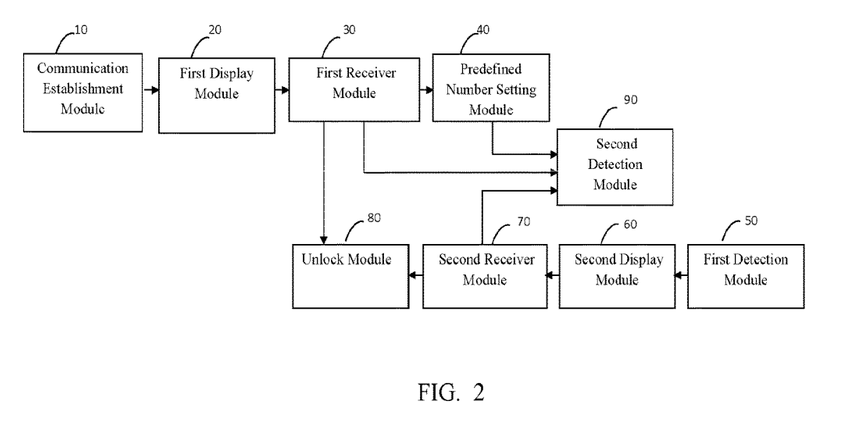
FIG. 2 is a block diagram of a Bluetooth watch according to an embodiment of the disclosure.

FIG. 2 illustrates a block diagram of a Bluetooth watch according to an embodiment of the disclosure. As shown in FIG. 2, the Bluetooth watch includes a communication establishment module 10, a first display module 20, a first receiver module 30, a predefined number setting module 40, a first detection module 50, a second display module 60, a second receiver module 70, an unlock module 80, and a second detection module 90.

The communication establishment module 10 may be configured to establish a communication connection between a Bluetooth watch and a mobile terminal and enable the Bluetooth watch to receive an instant notification message from the mobile terminal.

The first display module 20 may be connected to the communication establishment module 10; and the first display module 20 may be configured to display an encrypted interface to prompt a user to enter an initial password on a screen of the Bluetooth watch, after the communication connection between a Bluetooth watch and a mobile terminal is successfully established.

The first receiver module 30 may be connected to the first display module 20; and the first receiver module 30 may be configured to receive an initial password entered by the user at the encrypted interface displayed by the first display module 20 and store the initial password in the Bluetooth watch.

The predefined number setting module 40 may be connected to the first receiver module 30; and the predefined number setting module 40 may be configured to set a predefined number of times of entering the unlocking password, after the first receiver module 30 receives the initial password entered by the user at the encrypted interface and stores the initial password in the Bluetooth watch.

The first detection module 50 may be configured to detect whether or not the Bluetooth watch is removed by the user.

The second display module 60 may be connected to the first detection module 50; and the second display module 60 may be configured to hide an instant notification message received from the mobile terminal and display an unlock interface on the screen of the Bluetooth watch to prompt the user to enter an unlock password, after first detection module 50 is configured to detect that the Bluetooth watch is removed by the user.

The second receiver module 70 may be connected to the second display module 60; and the second receiver module 70 may be configured to receive the unlock password entered by the user at the unlock interface displayed by the second display module 60.

The unlock module 80 may be connected to the second receiver module 70 and the first receiver module 30; and the unlock module 80 may be configured to unlock the Bluetooth watch and display instant notification messages received from the mobile terminal on the screen of the Bluetooth watch, when the unlock password received by the second receiver module 70 matches an encryption password received by the first receiver module 30.

The second detection module 90 may be connected to the second receiver module 70, the first receiver module 30, and the predefined number setting module 40, respectively. The second detection module 90 may be configured to detect whether the number of unlock passwords entered by the user exceeds the predefined number of times set by the predefined number setting module 40, when the unlock password received by the second receiver module 70 does not match the encryption password received by the first receiver module 30. If the number of unlock passwords entered by the user exceeds the predefined number of times set by the predefined number, the Bluetooth watch may restore the factory setting and wait to re-establish a communication connection with the mobile terminal.

Advantages of the disclosure may follow. As compared with the prior art, this disclosure of an encryption method based on a mobile terminal for a Bluetooth watch and the Bluetooth watch thereof may establish a communication connection between the mobile terminal and the Bluetooth watch, so that the Bluetooth watch can receive an instant notification message from a mobile terminal. When the communication connection between mobile and the watch is successfully established, an encrypted interface may be displayed on the screen of the Bluetooth watch, prompting user to enter an initial password. The initial password entered by the user at the encrypted interface may be stored in the Bluetooth watch. The Bluetooth watch may detect whether or not the Bluetooth watch is removed by the user. When the Bluetooth watch is detected to be removed by the user, the Bluetooth watch may display an unlock interface on the screen to prompt the user to enter an unlock password and may receive the unlock password. The Bluetooth watch may unlock and display the instant notification message received from the mobile terminal when the unlock password matches an encryption password. By the one or more implementations as described above, the subject technology may reduce the possibility of leaking the user's private information when the Bluetooth watch is removed by the user, and thus improve information security when using a Bluetooth watch.

Figure 3:
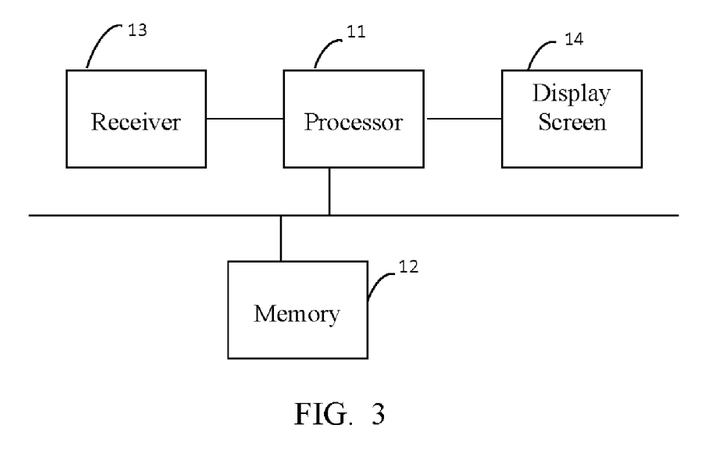
FIG. 3 is a block diagram of a Bluetooth watch in a form of an electronic system according to an embodiment of the disclosure.

FIG. 3 illustrates a block diagram of a Bluetooth watch in a form of an electronic system according to an embodiment of the disclosure. The electronic system may perform some implementations of the subject technology and the details may be described above and will not be discussed herein.

The electronic system includes a processor 11, a memory 12 coupled to the processor 11, a receiver 13 coupled to the processor 11, and a display screen 14 coupled to the processor 11.

The memory 12 may be configured to store program instructions, an encrypted interface that prompts a user to enter an initial password, the initial password, an instant notification message, and an unlock interface for prompting the user to enter an unlock password.

The receiver 13 may be configured to receive one or more instant notification messages.

The display screen 14 may be configured to display the encrypted interface and the unlock interface.

The processor 11 may be configured to execute program instructions to establish a communication connection between a Bluetooth watch and a mobile terminal, so that the receiver 13 of the Bluetooth watch may receive an instant notification message from the mobile terminal. The processor 11 may be configured to display an encrypted user interface on the display screen 14 of the Bluetooth watch to prompt a user to enter an initial password, after the communication connection is successfully established. The processor 11 may be configured to receive an initial password entered by the user at the encrypted interface and store the initial password in the Bluetooth watch. The processor 11 may be configured to hide the instant notification message received from the mobile terminal and display an unlock interface on the screen 14 to prompt the user to enter an unlock password, when the Bluetooth watch is detected to be removed by the user. The processor 11 may be configured to unlock the Bluetooth watch and display the instant notification message received from the mobile terminal, when the unlock password matches the encryption password.

The processor 11 may further be configured to set a predefined number of times for entering the unlock password, after receiving the initial password entered by the user at the encrypted interface and storing the initial password in the Bluetooth watch.

The processor 11 may further be configured to detect whether the number of unlock passwords entered by the user at the unlock interface exceeds the predefined number of times, when the unlock password does not match the encryption password. When the number of unlock passwords exceeds the predefined number of times, the Bluetooth watch restores the factory settings and waits to re-establish the communication connection with the mobile terminal again.

The processor 11 may further be configured to detect whether the Bluetooth watch is removed by the user. The procedure of detecting whether the Bluetooth watch is removed by the user may include: the processor may be configured to detect a heartbeat within the predetermined time period. If the processor cannot detect a heartbeat within a predetermined time period, the Bluetooth watch may be determined to be removed by the user.

In some embodiments, the communication method may be a Bluetooth communication connection.

In some embodiments, the encrypted interface may be an encrypted interface with a nine-grid pattern.

In the one or more embodiments of the present disclosure, it is understood that the disclosed system, device, and method may be implemented in other ways. For example, one or more embodiments associated with the disclosed device as described above are merely illustrative. One or more partitions of the disclosed modules and units merely include a logical functional partition, and the actual implementation may include another partition scheme. For example, multiple units or components may be integrated into another system, or some features may be omitted or may not be performed. In another embodiment, the illustrated or discussed mutual coupling, direct coupling or communication connection as described above may be an indirect coupling or a communication connection via one or more interfaces, devices, or units, and may be in an electrical form, a mechanical form, or other forms.

The units described as the individual components may or may not be physically discrete, and the components displayed as units may or may not be physical units; that is, the components displayed as units may be located in one place or may be distributed over a plurality of network units. Some or all of the units may be selected according to actual needs to achieve the purpose of the one or more embodiments of the present disclosure.

In addition, each functional unit in each embodiment of the present disclosure may be integrated in one processing unit, or each functional unit may exist physically in a discrete status, or two or more units may be integrated in one unit. The above-mentioned integrated unit can be realized in the form of a hardware or a functional software unit.

The integrated unit as described above may be stored in a computer-readable storage medium if the integrated unit is implemented in the form of a functional software unit and sold or used as a standalone product. Based on this understanding, a technical solution of the present disclosure in nature, a part of the technical solution which contributes to the prior art, or the technical solution either in part or in whole, can be embodied in the form of a software product that can be stored in a storage medium. The storage medium may include one or more instructions to enable a computing device (e.g., a personal computer, a server, or a network device) or a processor to perform all or part of the blocks as described in the one or more embodiments of the present disclosure. The storage medium as described above may include a USB flash drive, a removable hard disk, a ROM (Read-Only Memory), a random access memory (RAM), a magnetic disk, an optical disk, and other medium which can store program codes.

The above description merely depicts some exemplary embodiments of the disclosure, but is not limiting the scope of the disclosure. Any equivalent structure or flow transformations made to the disclosure, or any direct or indirect applications of the disclosure on any other related fields, shall all be covered within the protection of the disclosure.

What is claimed is:

1. A Bluetooth watch, comprising a processor, a memory coupled to the processor, a receiver coupled to the processor, and a display screen coupled to the processor, wherein,
   the memory is configured to store program instructions;
   the receiver is configured to receive an instant notification message;
   the display screen is configured to display an encrypted interface and an unlock interface;
   the processor is configured to execute program instructions to establish a communication connection between the Bluetooth watch and a mobile terminal, so that the receiver of the Bluetooth watch receives the instant notification message from the mobile terminal;
   the processor is further configured to display the encrypted interface on the display screen of the Bluetooth watch to prompt a user to enter an initial password, after the communication connection is successfully established;
   the processor is further configured to receive the initial password entered by the user at the encrypted interface and store the initial password in the Bluetooth watch;
   the processor is further configured to detect whether the Bluetooth watch is removed by the user;
   the processor is further configured to hide the instant notification message received from the mobile terminal and display an unlock interface on the display screen to prompt the user to enter an unlock password, when the Bluetooth watch is detected to be removed by the user;
   the processor is further configured to receive the unlock password entered by the user at the encrypted interface; and
   the processor is further configured to unlock the Bluetooth watch and display the instant notification message received from the mobile terminal, when the unlock password matches an encryption password.

2. The Bluetooth watch according to claim 1, wherein, after the processor is further configured to receive the initial password entered by the user at the encrypted interface and store the initial password in the Bluetooth watch, the processor is further configured to set a predefined number of times for entering the unlock password.

3. The Bluetooth watch according to claim 2, wherein the processor is further configured to detect whether the number of unlock passwords entered by the user at the unlock interface exceeds the predefined number of times, when the unlock password does not match the encryption password; and wherein the Bluetooth watch restores factory settings and waits to re-establish a communication connection with the mobile terminal, when the number of unlock passwords entered by the user at the unlock interface exceeds the predefined number of times.

4. The Bluetooth watch according to claim 1, wherein the block of the processor further configured to detect whether the Bluetooth watch is removed by the user comprises:
the processor is configured to detect whether there is a heartbeat within a predetermined time period; and
the processor is configured to detect the Bluetooth watch is removed by the user, if the processor is configured to detect no heartbeat within the predetermined time period.

5. The Bluetooth watch according to claim 1, wherein the communication connection is a Bluetooth communication connection.

6. The Bluetooth watch according to claim 1, wherein the encrypted interface is an encrypted interface with a nine-grid pattern.

7. An encryption method based on a mobile terminal for a Bluetooth watch, comprising:
establishing, by the Bluetooth watch, a communication connection with a mobile terminal, so that the Bluetooth watch receives an instant notification message from the mobile terminal;
displaying, by a screen of the Bluetooth watch, an encrypted interface to prompt a user to enter an initial password, after the communication connection is successfully established;
receiving, by the Bluetooth watch, the initial password from the user and storing the initial password in the Bluetooth watch;
detecting, by the Bluetooth watch, whether the Bluetooth watch is removed by the user;
hiding, by the Bluetooth watch, the instant notification message received from the mobile terminal, and displaying an unlock interface on the screen to prompt the user to enter an unlock password, when the Bluetooth watch is determined to be removed by the user;
receiving, by the Bluetooth watch, the unlock password entered by the user at the unlock interface; and
unlocking, by the Bluetooth watch, and displaying the instant notification message received from the mobile terminal, when the unlock password matches an encryption password.

8. The method accordingly to claim 7, further comprising, after the block of the Bluetooth watch receiving the initial password entered by the user at the encrypted interface and storing the initial password in the Bluetooth watch,
setting, by the Bluetooth watch, a predefined number of times for entering the unlock password.

9. The method accordingly to claim 8, further comprising:
detecting, by the Bluetooth watch, whether the number of unlock passwords entered by the user exceeds the predefined number of times when the unlock password does not match the encryption password; and
restoring, by the Bluetooth watch, factory settings and re-establishing, by the Bluetooth watch, the communication connection with the mobile terminal, when the number of unlock passwords entered by the user exceeds the predefined number of times.

10. The method of claim 7, wherein the block of the Bluetooth watch detecting whether the Bluetooth watch is removed by the user comprises:
detecting, by the Bluetooth watch, whether there is a heartbeat within a predetermined time period; and
determining, by the Bluetooth watch, the Bluetooth watch is removed by the user, if the Bluetooth watch cannot detect a heartbeat within the predetermined time period.

11. The method of claim 7, wherein the communication connection is a Bluetooth communication connection.

12. The method of claim 7, wherein the encrypted interface is an interface with a nine-grid pattern.

13. A Bluetooth watch comprising a processor and a non-transitory program storage medium containing program code executable by the processor, the program code comprising:
a communication establishment module configured to establish a communication connection between the Bluetooth watch and a mobile terminal to enable the Bluetooth watch to receive an instant notification message from the mobile terminal;
a first display module configured to display an encrypted interface to prompt a user to enter an initial password on a screen of the Bluetooth watch, when the Bluetooth watch successfully establishes the communication connection with the mobile terminal;
a first receiver module configured to receive the initial password entered by the user at the encrypted interface and store the initial password in the Bluetooth watch;
a first detection module configured to detect whether the Bluetooth watch is removed by the user;
a second display module configured to hide the instant notification message received from the mobile terminal, after detecting that the Bluetooth watch is removed by the user, and display an unlock interface to prompt the user to enter an unlock password on the screen of the Bluetooth watch;
a second receiver module configured to receive an unlock password entered by the user at the unlock interface; and
an unlock module configured to unlock the Bluetooth watch and display the instant notification message received from the mobile terminal on the screen of the Bluetooth watch, when the unlock password matches an encryption password.

14. The Bluetooth watch accordingly to claim 13, wherein the program code further comprises a predefined number setting module configured to set a predefined number of times for entering the unlock password, after the first receiver module receiving the initial password entered by the user at the encrypted interface and storing the initial password in the Bluetooth watch.

15. The Bluetooth watch of claim 14, wherein the program code further comprises a second detection module configured to detect whether the number of unlock passwords entered by the user exceeds the predefined number of times, when the unlock password does not match the encryption password, wherein the Bluetooth watch restores factory settings and waits to re-establish a communication connection with the mobile terminal, when the number of the unlock passwords entered by the user at the unlock interface exceeds the predefined number of times.

16. A Bluetooth watch of claim 13, wherein the communication connection is a Bluetooth communication connection.

17. A Bluetooth watch of claim 13, wherein the encrypted interface is an interface with a nine-grid pattern.

* * * * *